Figure 5:
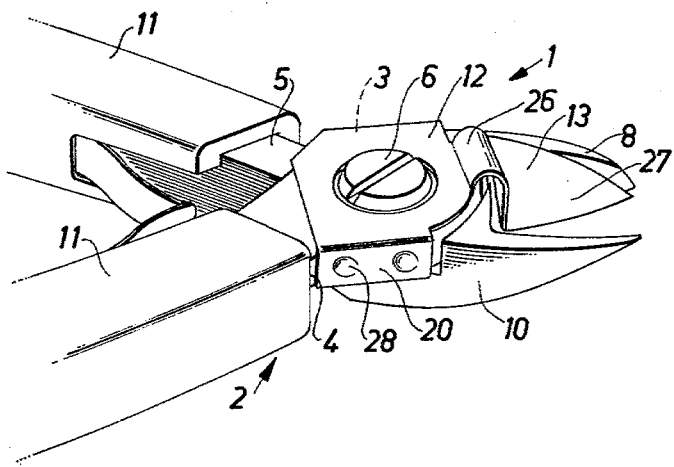

United States Patent [19]

Jansson et al.

[11] 4,247,983
[45] Feb. 3, 1981

[54] WIRE RETAINER AND DIAGONAL CUTTING NIPPER WITH WIRE RETAINER

[75] Inventors: Conny Jansson, Enköping; Lars Erlandsson; Rolf Appelkvist, both of Eskilstuna, all of Sweden

[73] Assignee: AB Bahco Verktyg, Enköping, Sweden

[21] Appl. No.: 69,366

[22] Filed: Aug. 24, 1979

[51] Int. Cl.³ .............................................. B26B 17/04
[52] U.S. Cl. ..................................... 30/124; 30/135
[58] Field of Search .......................... 30/124, 134, 135

[56] References Cited

U.S. PATENT DOCUMENTS

| 2,323,497 | 7/1943  | Strout ......................... 30/124 |
| 3,126,628 | 3/1964  | Popek .......................... 30/134 |
| 3,722,093 | 3/1973  | Kaufman ....................... 30/124 |
| 3,763,560 | 10/1973 | Makkay et al. ................. 30/124 |
| 3,842,500 | 10/1974 | Cassel ......................... 30/124 |

Primary Examiner—Frank T. Yost
Attorney, Agent, or Firm—Oblon, Fisher, Spivak, McClelland & Maier

[57] ABSTRACT

A wire retainer, as well as a side nipper provided with such wire retainer, which is made from sheet metal and fittable to a side nipper of the kind consisting of two members crossing each other at a joint portion, which are pivotably kept together by a hinge means and form the jaws and handles of the nipper. The wire retainer prevents offcuts from dropping when cutting and has an elastically yielding wire retainer tongue projecting out along one jaw of the nipper to retain the offcut between it and the opposite jaw. The wire retainer has an attachment portion from which the wire retainer tongue projects. The attachment portion comprises a plate with a hook on one side edge and a flange on its other side edge for removal and fitting without tools to one of the members of the nipper in the region of the hinged portion.

8 Claims, 6 Drawing Figures

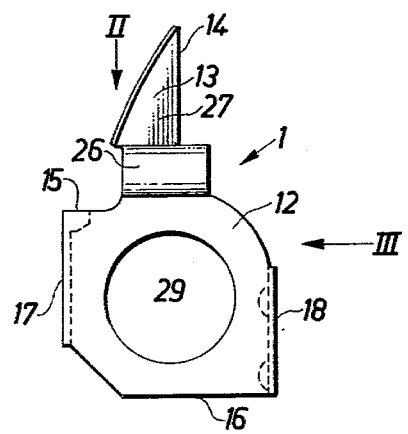
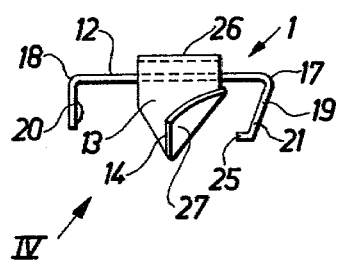
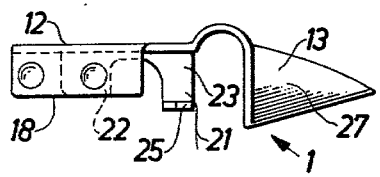
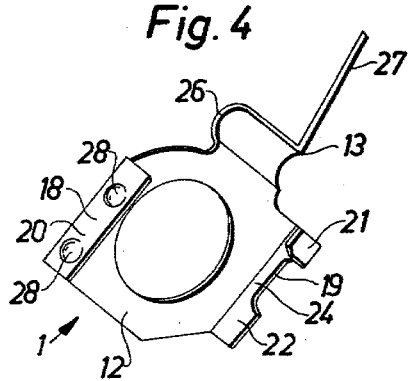

WIRE RETAINER AND DIAGONAL CUTTING NIPPER WITH WIRE RETAINER

The invention relates to a wire retainer and a diagonal cutting nipper or side nipper with such a retainer, which is made from sheet metal and intended for attaching to a side nipper of the kind consisting of two members crossing each other at a hinge or joint portion, these members being pivotably kept together by a hinge means at the joint portion and forming jaws with cutting edges fowards of the joint portion of the nipper and arms rearwards of the joint portion thereof. Such a wire retainer, when fitted to one member of the side nipper, serves to prevent offcuts from dropping when cutting wire with the nipper. The retainer has a wire retaining tongue projecting out along one jaw of the nipper and adapted for coming into resilient yielding engagement against the edge of the second jaw when the jaws are closed, to retain a wire offcut between it and the second jaw until the jaws have been opened slightly. Side nippers of this kind are primarily used in producing electronics components and electronic equipment, as well as during servicing such equipment.

Previously known types of such wire retainers and side nippers provided with them are burdened with a troublesome disadvantage. These earlier retainers are namely adapted for being riveted or screwed to the side nipper. A wire retaining tongue, irrespective of how well-adapted it is, will always obscure some small part of the workpiece and can be an operational hinder, resulting in that a side nipper without a retainer is preferably used where there is no danger of flying or falling wire offcuts causing any damage. In other cases, however, there is the risk that wire offcuts could cause eye injuries, for example, or remain in the workpiece to cause functional disturbances later on, and with many items of electronic equipment having an important function from the point of view of safety, this could lead to personal injury as well as damage to material. As a safety measure it is therefore very often necessary to use a side nipper with a wire retainer. In practice, this can to some extent have led to the unnecessary use of nippers provided with wire retainers which have been an operational hindrance, and perhaps such a nipper has not been used on some occasions where it would have been an advisable safety measure for preventing wire offcuts from coming into sensitive places. This would have been for the same reason in both cases, i.e. that only one nipper was available, and that it was too troublesome either to remove the wire retainer or to attach one.

The object of the invention is therefore to provide a wire retainer which can easily and quickly be attached to the nipper, and just as easily and quickly removed, and which is formed such that when fitted to the nipper it will obscure the workpiece as little as possible.

A further object is thus to provide a nipper with a wire retainer such that the nipper is quickly and easily convertible for varying jobs.

These objects are attained by the wire retainer being formed with an attachment portion carrying the wire retaining tongue, said portion comprising a plate with front edge, rear edge and two side faces formed by flanges projecting in the same direction from the sides of the plate, a first flange being formed near the forward edge of the plate with a flap bent back at substantially 180°, so that it forms a hook, while the opposite, second flange is bent substantially perpendicular to the plate, the tongue consisting of a flap projecting from the forward edge of the plate with a rear portion joining the front edge of the plate and bent outwards from the front edge in a direction away from said both flanges, and bent backwards in a curve to merge into a forward portion extending forwards from the rearward portion in the form of a blade disposed obliquely in relation to the plate.

Figure 6:
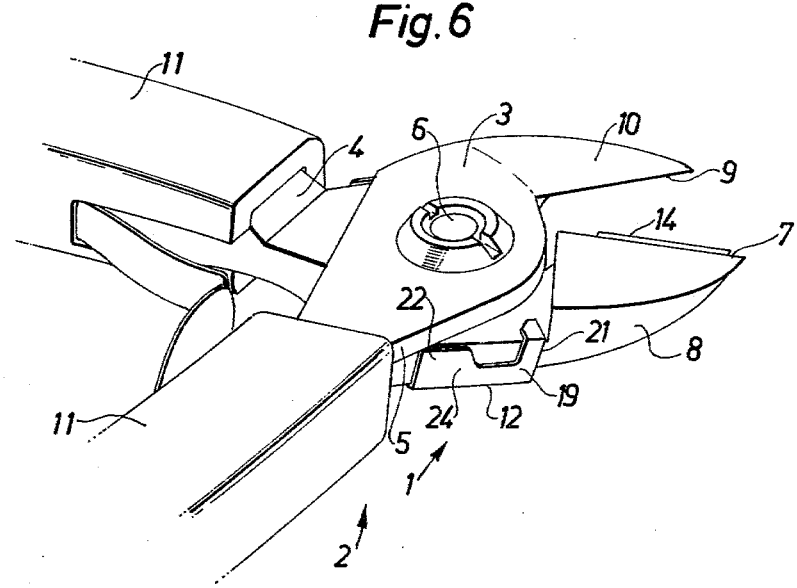

A preferred embodiment of the invention is described in detail in the following with reference to the attached drawings, on which FIG. 1 is a plan of a wire retainer in accordance with the invention, FIG. 2 is an end view seen from the front of the retainer, i.e. in the direction of arrow II in FIG. 1, FIG. 3 is a side view of the same wire retainer, seen from the direction of the arrow III in FIG. 1, FIG. 4 is a view seen at an angle to the inner side of the wire retainer in accordance with the arrow IV in FIG. 2, FIG. 5 is a partial view of the joint and jaw portions of a side nipper, with the wire retainer according to FIGS. 1–4 fitted to one member thereof, and FIG. 6 is a similar view of the side nipper of FIG. 5 although this view shows the underside of the joint and jaw portions of the side nipper.

The wire retainer 1 is made from sheet metal, preferably steel, and adapted for attaching to a side nipper 2 (FIGS. 5 and 6). The nipper is of the kind consisting of two members 4, 5 crossing each other at a joint portion 3, said members being pivotably kept together by a hinge means 6 at the joint portion. Forwards of the joint portion, the members form jaws 8 provided with cutting edges 7, and rearwards of the joint portion they form arms for the grips 11, which are only partially shown in FIGS. 5 and 6.

The retainer 1 is intended for fitting to one member 4 of the nipper 2, in the region of the joint portion 3, and serves to prevent wire offcuts from flying off when cutting wire with the nipper. With this object in view, the wire retainer comprises an attachment portion 12, and integral therewith a wire retaining tongue 13 projecting forwards from the attachment portion and which, when the nipper jaws are closed, comes into resilient yielding engagement with the jaw 10 on the opposite member, or more exactly, a wire retaining edge 14 on the tongue bears against the jaw 10 close to, and along the edge 9.

The attachment portion 12 comprises a plate with forward edge 15, rear edge 16 and two side faces 17, 18 formed by projecting flanges 19, 20 bent up in the same direction from the plate.

At the front edge 15 of the plate, the flange 19 is formed with a flap which is bent at substantially 180°, so that it forms a hook 21, while the opposite flange 20 is bent substantially at right angles to the plate. The flange 19 has a further flap 22 at its rear end, this flap forming an acute angle to the plate, similar to an intermediate portion 13 of the hook 21 and a narrower flange portion 24 situated between the flap 22 and hook 21. As will be seen from FIG. 6, the hook 21 goes over the thickness of the member 4 with an outer hook end 25 engaging against the side of the member 4 facing inwards towards the member 5, in a region of the joint portion 3 on the member 4 lying radially outside, but close to the second member 5. The opposite flange 20 is oriented along the opposite edge of the joint portion of the member 4, as will be best seen from FIG. 5.

The wire retaining tongue 13 comprises a flap projecting from the forward edge 15 of the attachment portion 12, said flap having a rear portion 26 joining said front edge and bent outwards from the front edge of the plate, after which it is bent forwards-inwards in a curve to merge into a forward portion 27. The forward portion extends forwards from the rear portion in the form of a blade which is oblique in relation to the plate and closely follows the configuration of a deep bevel on the jaw 8 of the member 4. This bevel, together with a complementary bevel on the jaw 10 of the member 5, forms a V-shaped recess in the upper side of the jaw portion when the jaws are closed. What is just described here is the usual depression at the jaw portion of diagonal cutting nippers, at the bottom of which the edges are situated at such a depth as to be in a lower jaw limiting surface common to both jaws and which is either slightly curved or flat, seen from the underside of the nipper. The blade-like skewed forward portion 27 of the wire retaining tongue 13 is provided with the wire retaining edge 14, already mentioned.

On its inside, the flange 20 has projections in the form of nodules 28, to improve the engagement of the flange against the edge of the member 4, when the wire retainer is attached to the member by a snap fit.

To make room for a projecting portion of the joint means 6, the attachment portion 12 of the retainer is provided with a central hole 29.

The function of the side nipper 2 provided with the wire retainer 1 is now obvious. When cutting a wire (not shown), the resulting offcut, seen in accordance with FIG. 5, is situated above the cutting point determined by the edges 7 and 9. When the jaws are moved towards each other, the offcut will then be kept between the retainer edge 14 and the jaw 10, closely adjacent to the edge 9, since the retaining tongue 13 is yieldingly pressed against the jaw 10 but now comes against the offcut lying between. The offcut is first released when the jaws are opened slightly.

The blade-shaped forward portion 27 of the retainer tongue 13, which closely adheres to the configuration of the jaw, only obscures the workpiece to a very small extent. When it is necessary to localize the cut very carefully, this minor hindrance to the view can also be easily removed, by removing the wire retainer 1 from the nipper. This is done by lifting the retainer upwards, gripping under the flange 20, as seen in FIG. 5.

The wire retainer 1 can just as easily and quickly be fitted to the nipper, by hooking the hook 21 over the edge of the member 4 and pressing the attachment portion 12 towards the joint portion 3 of the nipper, so that the flange 20 snaps over the opposite edge of the member 4.

We claim:

1. A wire retainer made from sheet metal for attaching to a diagonal cutting nipper or side nipper of the kind consisting of two members crossing over each other at a joint portion, and which are pivotably kept together by a hinge means at the joint portion to form jaws provided with cutting edges forwards of the joint portion, and nipper arms rearwards of the joint portion, the retainer serving to prevent offcuts from dropping during wire cutting with the nipper, when the retainer is fitted to a first one of the members of the nipper, the retainer comprising an attachment portion and a wire retainer tongue integral therewith, which projects outwardly from the attachment portion and is adapted to come into resilient yielding engagement against the jaw of a second one of the member when the jaws are closed, the attachment portion consisting of a plate with a front edge, a rear edge and two side faces formed by flanges upstanding in the same direction from the plate, a first flange being formed at the front edge of the plate with a flap bent at substantially 180° to form a hook, while the opposing second flange is bent substantially at right angles to the plate, the tongue comprising a flap projecting from the front edge of the plate, with a rear portion joined to the front edge of the plate and bent from said edge outwards in a direction away from said both flanges and bent over inwards in a curve to merge into a forward portion extending forwards from the rear portion in the form of a blade which is oblique in relation to the plate.

2. A wire retainer as claimed in claim 1, wherein the said first flange has at its rear end a further rear flap which, similar to an intermediate portion of said hook and a narrow flange portion between the hook and the rear flap forms an acute angle to said plate.

3. A wire retainer as claimed in claim 1, in which said second flange has projections on its inside for improving engagement.

4. A wire retainer as claimed in claim 1, in which said plate has a central hole for a projecting portion of the nipper hinge means.

5. A diagonal cutting nipper with a first and a second member crossing each other at a joint portion, which are pivotably kept together by a hinge means in the joint portion and forwards thereof form the jaws provided with cutting edges of the nipper, and rearwards thereof form both arms of the nipper, the edges being situated at the intersection between a substantially flat defining surface on the underside of the jaws and a defining surface on the upper side of the jaws in a depression which is formed by bevels in both jaws, a wire retainer made from sheet metal being attached to the first member of the nipper at the joint portion and adapted for preventing offcuts from dropping when cutting wire with the nipper, the retainer comprising an attachment portion and integral therewith a wire retainer tongue projecting forwards from the attachment portion along the jaw of the first member and extending laterally past the edge of this jaw towards the adjacent second jaw so that with closed jaws it resiliently and yieldingly engages with its wire retaining edge against and along the edge of the second jaw, the attachment portion comprising a plate with front edge, rear edge and side faces formed from bent-up flanges, said plate engaging against the first nipper member at the joint portion, its flanges gripping round the first member in the joint portion, extending along side edges thereof, with the first of the flanges being so formed at the front edge of the plate with a flap bent inwardly at substantially 180° so that it forms a hook, the outer end of which engages against the side of the first member facing inwards towards the second member in a region at the joint portion on the first member outside, but closely adjacent the second member, while the opposite, second flange is bent inwards substantially at right angles to the plate of the wire retainer, whereby the retainer is removably snapable onto the nipper, the tongue comprising a flap projecting from the front edge of the plate and having a rear portion joining onto the front edge of the plate and from there being bent outwards from the plate and bent in a curve forwards-backwards to merge into a forward portion extending forwards from the rear portion in the form of a blade, which is oblique in relation to the plate, closely adheres to the form of said bevel in the jaw of the first member and is provided with said wire retaining edge.

6. A nipper as claimed in claim 5, in which the first flange of said wire retainer has a further flap at its rear end, which, similar to an inner portion of said hook and a narrow portion of the flange situated between it and the rear flap, forms an acute angle to said plate.

7. A nipper as claimed in claim 5, in which said second flange of the wire retainer has projections on its inside to give improved snap-on engagement with the edge of the first member.

8. A side nipper as claimed in claim 5, in which said plate of said wire retainer has a central hole intended for accomodating a projecting portion of said hinge means.

* * * * *